(12) United States Patent  
Shimoda

(10) Patent No.: US 6,674,592 B2
(45) Date of Patent: Jan. 6, 2004

(54) DEMODULATION METHOD AND DEMODULATOR

(75) Inventor: Kaneyasu Shimoda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 353 days.

(21) Appl. No.: 09/747,073

(22) Filed: Dec. 21, 2000

(65) Prior Publication Data

US 2002/0017950 A1 Feb. 14, 2002

(30) Foreign Application Priority Data

Jul. 13, 2000 (JP) ........................................ 2000-212334

(51) Int. Cl.⁷ ................................................ G11B 5/09
(52) U.S. Cl. ............................................ 360/51; 360/46
(58) Field of Search ............................ 360/46, 51, 32, 360/53

(56) References Cited

U.S. PATENT DOCUMENTS

| | | | |
|---|---|---|---|
| 5,969,639 A | | 10/1999 | Lauf et al. ............. 340/870.17 |
| 6,307,696 B1 | * | 10/2001 | Bishop et al. ................ 360/51 |
| 6,370,188 B1 | * | 4/2002 | Wu et al. .................... 375/222 |
| 6,469,862 B2 | * | 10/2002 | Stein et al. .............. 360/77.02 |
| 6,487,672 B1 | * | 11/2002 | Byrne et al. ................ 713/400 |
| 2002/0021519 A1 | * | 2/2002 | Rae ............................. 360/51 |

* cited by examiner

*Primary Examiner*—Regina N. Holder
(74) *Attorney, Agent, or Firm*—Greer, Burns & Crain, Ltd.

(57) ABSTRACT

This invention provides a demodulation method and a demodulator for demodulating by converting analog signal obtained by reading information stored in a recording medium to digital signal so as to generate data representing that information. Consequently, correct data is obtained from signal having low S/N ratio. Over-sampling is carried out by an A/D converter 103A and a digital signal synchronous with a proper clock is reproduced by interpolation computation, maximum likelihood is detected and RLL decoded. Then, error is corrected by an error correction code.

10 Claims, 9 Drawing Sheets

DEMODULATION METHOD AND DEMODULATOR

BACKGROUND OF THE INVENTION

1. Field of the Invention

The present invention relates to a demodulation method for demodulation by converting analog signal obtained by reading information memorized in a recording medium to digital signal so as to generate data representing the information and a demodulator.

2. Description of the Related Art

Since before, there has been an information recording/reproducing apparatus for recording information in a recording medium and reproducing information by reading it from that recording medium. The information recording/reproducing apparatus includes, for example, a magnetic disc unit in which information is recorded on a magnetic disc and the information is reproduced by reading out from the magnetic disc.

FIG. 9 is an outline diagram showing a magnetic disc unit, which is an example of such an information recording/reproducing apparatus.

A magnetic disc 10 is rotated in a direction indicated by an arrow A around a center shaft 11 by a spindle motor (not shown).

An actuator 20 is rotated around a rotation shaft 21 so as to move a magnetic head 30 provided on a front end thereof in a radius direction (a direction of arrow B) of the magnetic disc 10 along the surface of the magnetic disc 10. The magnetic head 30 records information based on signal sent from a signal recording/reproducing portion 40 into the magnetic disc 10 and picks up information recorded in the magnetic disc 10 and sends it to the signal recording/reproducing portion 40.

The signal recording/reproducing portion 40 receives data signal carrying recording information form outside when the information is recorded to the magnetic disc 10 and carries out a predetermined processing including run length limited (RLL) coding. The magnetic head 30 is driven according to a signal after the processing, so as to record information in the magnetic disc 10. On the other hand, when the information is reproduced from the magnetic disc 10, error correction processing and RLL decoding processing are carried out on signal picked up by the magnetic head 30 and sent out of this magnetic disc unit.

Servo information for controlling the position of the magnetic head 30 with respect to the magnetic disc 10 as well as ordinary information for read/write are recorded in the magnetic disc 10. This servo information is picked up by the magnetic head 30 and sent to the position control portion 50 through the signal recording/reproducing portion 40. The position control portion 50 controls an operation of the actuator 20 for the magnetic head 30 provided at a front end of the actuator 20 to move with respect to the magnetic disc 10 to a desired position based on the information.

FIG. 10 is a block diagram of a conventional demodulator which composes a signal reproducing portion for reproducing data indicating information recorded in the magnetic disc 30 from signal picked up by the magnetic head 30, in the signal recording/reproducing portion 40 of the magnetic disc unit shown in FIG. 9.

Analog signal obtained by a signal pickup of the magnetic head 30 is inputted to gain control amplifier (GCA) 101 capable of changing amplification factor in the demodulator 100 and amplified appropriately. Output analog signal from the GCA 101 is inputted to an analog equalizer 102 and equalized by this equalizer. After that, this signal is converted to digital signal by the A/D converter 103 and maximum likelihood is detected by a maximum likelihood detector 102. A result of maximum likelihood detection is RLL decoded by a RLL decoder. Then, an error is corrected by error correction code (ECC)106 so as to reproduce right data.

Here, the digital signal outputted from the A/D converter 103 is also inputted to an automatic gain control (AGC) 107 and phase locked loop (PLL) 108.

Prior to description of an operation of the AGC 107 and PLL 108, first, data structure of information to be picked up from the magnetic disc 30 will be described.

FIG. 11 is a diagram showing data structure of information to be picked up from the magnetic disc.

First, acquisition portion GAP is disposed and next, sync byte portion SB for indicating a start of proper data is disposed followed by the proper data.

The AGC 107 and PLL 108 shown in FIG. 10 use signal from the acquisition portion GAP. The AGC 107 adjusts amplification factor of the GCA 101 based on the output digital signal from the A/D converter 103 of the acquisition portion GAP so that appropriately amplified signal is outputted from the GCA 101. The PLL 108 generates a clock signal which is a reproduction of a clock upon recording of information, based on the output digital signal from the A/D converter 103. Signal amplified appropriately depending on the size of signal picked up by the magnetic head is outputted from the GCA 101 to the sync byte portion SB at a timing in which actual data is inputted. A/D conversion is carried out by the A/D converter 103 at a clock reproduced to be same as the clock upon recording information.

Because in recent years, high density recording has been accelerated in information recording/reproducing apparatus such as magnetic disc unit, noise increases in the acquisition portion GAP resulting therefrom, so that a minute defect in a recording medium affects relatively largely. If the defects in the recording medium are accumulated in the recording portion of the acquisition portion GAP, adjustment of the amplification factor and reproduction of the clock by the AGC 107 and PLL 108 are not carried out excellently. Consequently, so-called cycle skip and A/D converter clamp occur so that a long burst error may occur. If the burst error occurs, correction is disabled even if a high performance ECC 106 is employed, so that accurate data reproduction is disabled. Thus, the performance of the demodulator is determined depending on how accurately the AGC and PLL are operated.

SUMMARY OF THE INVENTION

In views of the above-described problem, the present invention intends to provide a demodulation method and a demodulator capable of obtaining correct data even if S/N ratio is lower than conventional.

To achieve the above object, according to an aspect of the present invention, there is provided a demodulation method for demodulation by converting analog signal carrying a first clock of a predetermined first frequency obtained by reading information recorded in a recording medium to digital signal so as to generate data representing the information, wherein the analog signal is converted to a first digital signal by over-sampling synchronous with a second clock of a second frequency higher than the frequency of the first clock and a phase error of the first clock with respect to the second clock is obtained based on the first digital signal.

According to another aspect of the present invention, there is provided a demodulator for demodulation by converting analog signal carrying a first clock of a predetermined first frequency obtained by reading information recorded in a recording medium to digital signal so as to generate data representing the information, the demodulator comprising:

an A/D converter for converting the analog signal to a first digital signal by over-sampling synchronous with a second clock of a second frequency higher than the frequency of the first clock;

a buffer for storing the first digital signal; and an operating portion for obtaining a phase error of the first clock with respect to the second clock based on the first digital signal stored in the buffer.

According to the demodulation method and demodulator of the present invention, over-sampling is carried out synchronously with a clock (second clock) having a higher frequency (second frequency). A first digital signal obtained by the over-sampling is converted to a second digital signal synchronous with a clock (first clock) of a proper frequency (first frequency). Then, the second digital signal obtained in that way is decoded. Therefore, the necessity of the acquisition portion is eliminated thereby formatting efficiency being improved.

According to the present invention, the clock frequency (first frequency) of the first clock and phase are extracted by computation on data. Therefore, even if the S/N ratio is low, it is possible to eliminate a burst error which is generated conventionally when leading into the PLL (arrival to proper operation) is incomplete, so as to achieve normal operation of the demodulator.

Meanwhile, the AGC and GCA shown in FIG. 10 can be adjusted by adjusting data value corresponding to an amplification factor of the GCA on data because the present invention depends on mainly computation on data. Therefore, for example, the amplification factor of the GCA can be maintained at a fixed value while omitting the AGC, instead of changing the amplification factor of the GCA largely.

Preferably, in the demodulator of the present invention, the operating portion comprises:

a Fourier transforming portion for Fourier-transforming the first digital signal;

a clock extracting portion for obtaining the first frequency and an initial phase of the first clock with respect to the second clock from Fourier transformation signal obtained from the Fourier transformation by the Fourier transforming portion; and a phase error computing portion for obtaining a phase error of each clock pulse of the first clock with respect to the second clock based on the first frequency and the initial phase obtained by the clock extracting portion.

In this case, the clock extracting portion may obtain the first frequency by linear estimation of amplitude values of frequencies before and after the first frequency based on amplitude information of the amplitude information and phase information composing the Fourier transformation signal, and may obtain the initial phase by linear interpolation using the phases of frequencies before and after the first frequency based on the phase information.

Further, the operating portion may further comprise an interpolation computing portion for obtaining a second digital signal synchronous with the first clock by interpolating the first digital signal based on phase error information obtained by the phase error computing portion.

For example, by this computation, the first clock can be obtained at a sufficient accuracy, and the second digital signal, which is a proper signal, can be generated from the first digital signal obtained by over-sampling at a sufficient accuracy.

Further, preferably, the demodulator of the present invention is provided with an equalizer for equalizing analog signal obtained by reading information stored in the recording medium at a pre-stage of the A/D converter. Further, it is permissible to provide a low-pass filter portion for carrying out low-pass filtering on the analog signal obtained by reading information stored in a recording medium, at a pre-stage of the A/D converter. Further, it is also permissible to provide a FIR filter conforming to the second clock between the A/D converter and buffer so as to progress the equalization. Further, it is permissible to provide a FIR filter conforming to the first clock between the operating portion and demodulating portion so as to progress the equalization.

In any case, demodulation to correct data is urged.

Further, in the demodulator of the present invention, the above-described demodulating portion may be provided with an error correction code portion which acts as a buffer at the same time.

Sharing the buffer leads to reduction of the circuit size.

As described above, according to the present invention, it is possible to raise a probability that correct data can be obtained from signal having low S/N ratio, as compared to the conventional technology.

DETAILED DESCRIPTION OF THE PREFERRED EMBODIMENTS

Hereinafter, the preferred embodiments of the present invention will be described with reference to the accompanying drawings.

Figure 1:
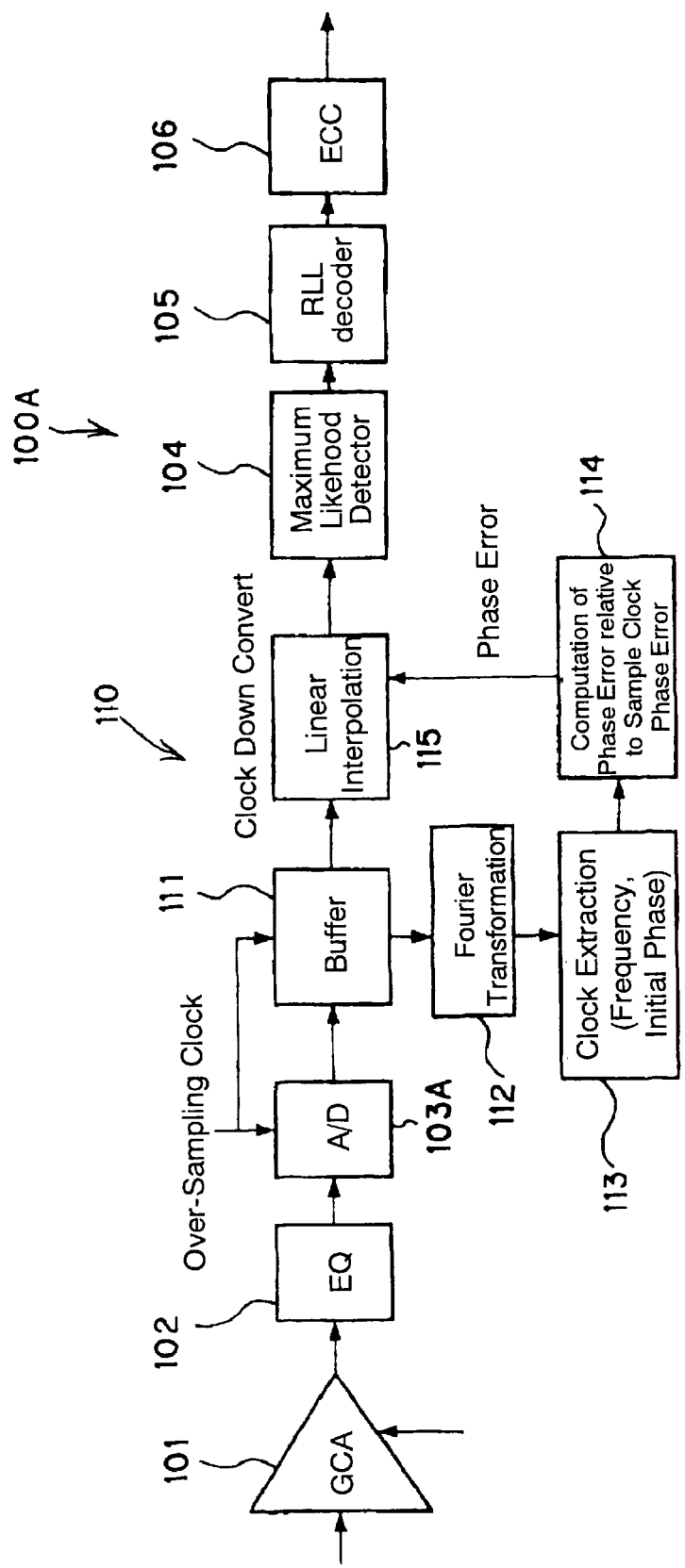
FIG. 1 is a block diagram showing a demodulator according to the first embodiment of the present invention.

FIG. 1 is a block diagram showing a demodulator according to the first embodiment of the present invention.

Figure 9:
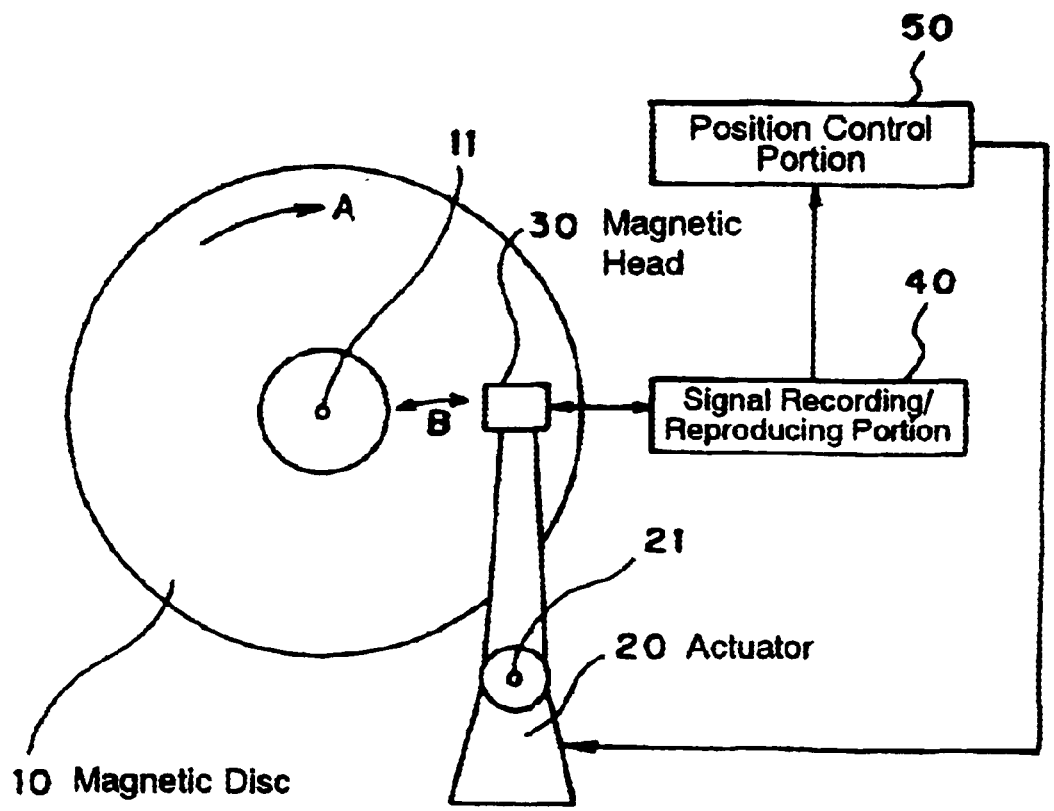
FIG. 9 is an outline diagram of a magnetic disc unit.
Figure 10:
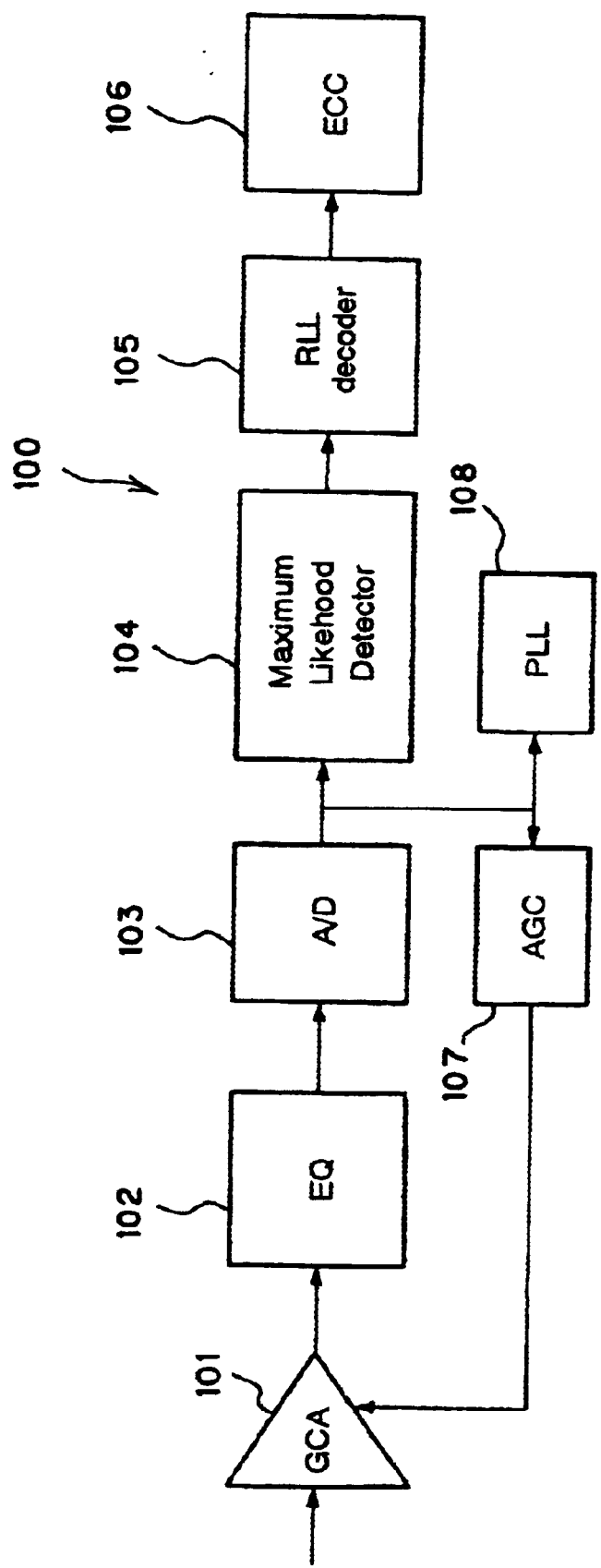
FIG. 10 is a block diagram of a conventional demodulator.

Conceptually, a demodulator 100A shown in FIG. 1 can be incorporated in a signal recording/reproducing portion 40 of a magnetic disc unit shown in FIG. 9 instead of a conventional demodulator 100 shown in FIG. 10. In FIG. 1 and other figures describing various demodulators, which will be referred to, like reference numerals shown in FIG. 10 are attached to the same components as the demodulator 100 shown in FIG. 10 and mainly a different point will be described.

Figure 2:
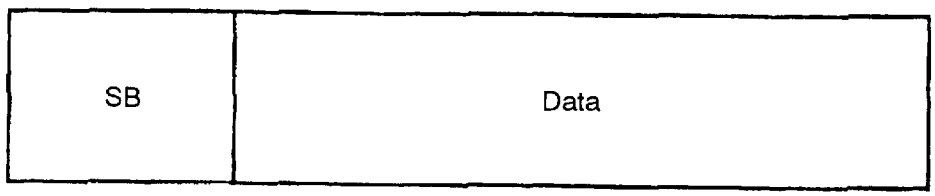
FIG. 2 is a diagram showing data structure employed when the demodulator of FIG. 1 is applied to a magnetic disc unit shown in FIG. 9.

FIG. 2 is a diagram showing data structure employed when the demodulator 100A of FIG. 1 is applied to the magnetic disc unit shown in FIG. 9.

Figure 11:
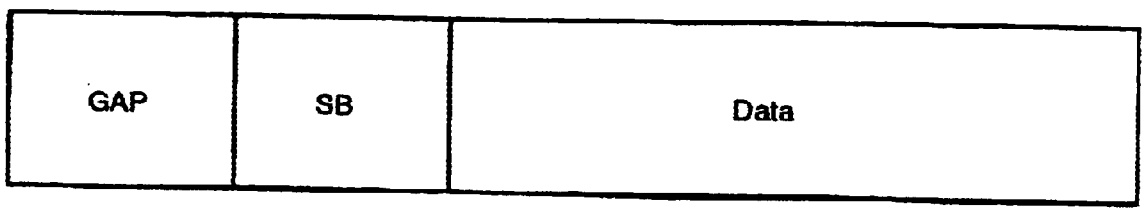
FIG. 11 is a diagram showing the data structure of information picked up from the magnetic disc.

The data structure shown in FIG. 2 indicates a type in which acquisition portion GAP is omitted as compared with the data structure employed conventionally shown in FIG. 11 and comprises sync byte portion SB and actual data.

Analog signal carrying the data structure shown in FIG. 2, which was picked up by the magnetic head 30 (see FIG. 9), is inputted into the GCA 101 of the demodulator 100A shown in FIG. 1 and amplified appropriately. Here, the amplification factor of the GCA 101 is fixed.

An analog signal outputted from the GCA 101 is equalized by an equalizer 102 and converted to digital signal by an A/D converter 103A. The A/D converter 103A carries out quick A/D conversion by over-sampling using an over-sampling clock (equivalent to a second clock mentioned in the present invention) having a higher frequency (equivalent to a second frequency mentioned in the present invention) than a frequency (equivalent to a first frequency mentioned in the present invention) of a clock (equivalent to a first clock mentioned in the present invention) upon recording of information. Digital signal (equivalent to a first digital signal mentioned in the present invention) obtained from the over-sampling in the A/D converter 103A is stored in a buffer 111 temporarily. Digital signal stored in this buffer 111 is inputted into an operating portion 110. A detailed operation algorithm will be described later. This operating portion 110 obtains the frequency of a proper clock (first clock) and a phase of the proper clock with respect to the over-sampling clock (second clock). A digital signal (equivalent to a second digital signal mentioned in the present invention) equivalent to a digital signal obtained from sampling synchronous with the proper clock is generated by linear interpolation operation by a linear interpolating portion 115 which is a component of the operating portion 110.

According to this embodiment, as described above, the over-sampling is carried out and then, a digital signal equivalent to a digital signal synchronous with the proper clock is reproduced by an operation on the digital signal. Consequently, first, as shown in FIG. 2, the acquisition portion GAP (see FIG. 11) becomes unnecessary thereby format efficiency being improved. Second, the PLL 108, which is employed in the conventional demodulator 100 of FIG. 10, becomes unnecessary and it is possible to eliminate a burst error, which occurs when the PLL is not operated properly because S/N of an analog signal picked up by the magnetic head is poor, so that a high precision data demodulation can be expected.

According to this embodiment, signals of a sector are stored in the buffer 111 all at once. In the operating portion 110 and subsequent processings, the signals of a sector are processed as a batch simultaneously.

Subsequent operation processing of a digital signal (second digital signal) obtained from interpolation in the linear interpolating portion 115 of the demodulator 100A of the first embodiment shown in FIG. 1 is the same as a processing explained with reference to FIG. 10. A processed digital signal is inputted to a maximum likelihood detector 104 so as to detect maximum likelihood. Its maximum detection result is RLL decoded by PLL decoder 105 and then, an error is corrected by an ECC 106 so as to reproduce new data.

According to this embodiment, as described above, the amplitude factor of the GCA 101 is fixed. Thus, if the frequency or phase of the proper clock (first clock) cannot be extracted by the operating portion 110 or a proper operation is not carried out in the maximum likelihood detectors 104, RLL 105, and ECC 106, the digital signal stored temporarily in the buffer 111 is amplified or attenuated and then, by operating again, a proper operation is enabled. The conventional demodulator shown in FIG. 10 includes AGC 107 so as to control the amplification factor of the GCA 101. The reason is that because the conventional demodulator cannot repeat the operation unless the analog signal is picked up from the magnetic head, the amplification factor of the GCA 101 has to be controlled to be optimum. Although an excellent effect is produced when the amplification factor of the GCA 101 is controlled to be optimum, if the amplification factor shifts largely as described above, a clamp occurs in the A/D converter so that a long burst error may occur.

Next, the operating portion 110 of the demodulator 100A shown in FIG. 1 will be described. A digital signal, which is obtained by over-sampling in the A/D converter 103A and stored in the buffer 111 temporarily, is inputted to a Fourier transforming portion 112. Then, discrete Fourier transformation is carried out in this Fourier transforming portion 112 and after the Fourier transformation, data is sent to the clock extracting portion 113. This clock extracting portion 113 detects a peak having a large spectrum based on the data after Fourier transformation. Consequently, the frequency of the proper clock (first clock) and an initial phase of the proper clock (first clock) with respect to an over-sampling clock (second clock) are obtained.

If the over-sampling is carried out with an over-sampling clock (second clock) of a frequency n times the frequency of the proper clock, the frequency of the proper clock (first clock) is frequency 1/n times the Nyquist frequency of over-sampling. Here, n is set to 1.0<n<2.0 in order to suppress the speed of the A/D conversion. Thus, it comes that the frequency of the proper clock is located in the middle of discrete spectrum obtained by discrete Fourier transformation. The frequency (first frequency) of the proper clock (first clock) and the initial phase are obtained as follows.

Figure 3:
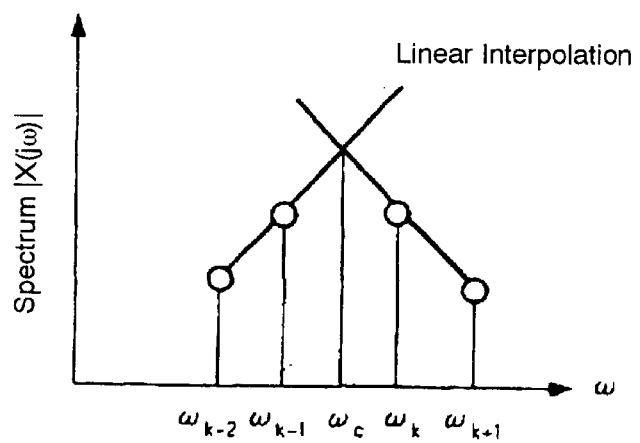
FIG. 3 is an explanatory diagram showing a method for obtaining the frequency of a proper clock in a clock extracting portion of FIG. 1.

FIG. 3 is an explanatory diagram showing a method for obtaining the frequency of a proper clock in a clock extracting portion of FIG. 1.

In FIG. 3, the axis of abscissa $\omega$ indicates angular frequency and the axis of ordinate indicates spectrum $|X(j\omega)|$. Where $X(j\omega)$ indicates data (j is an imaginary unit) obtained by discrete Fourier transformation and $|X(j\omega)|$ indicates its absolute value.

$\omega_{k-2}$, $\omega_{k-1}$, $\omega_k$, $\omega_{k+1}$ on the axis of abscissa of FIG. 3 indicate discrete angular frequencies of k–2th, k–1th, kth and k+1th and empty circles indicate spectrum of each discrete angular frequency. $\omega_c$ on the axis of abscissa indicates the angular frequency of a proper clock intended to be obtained.

In the Fourier transforming portion 112 shown in FIG. 1, assuming that a sequence of signals read out from the buffer 111 is x(nT) (where n is a sampling number and T is a sampling interval) and a sum of samplings is N, the Fourier transforming portion 112 carries out discrete Fourier transformation based on a following expression.

$$X(j\omega_k) = \sum_{n=0}^{N-1} x(nT)e^{-j\frac{2\pi nk}{N}} \tag{1}$$

However, for the expression (1) to be formed, when it is assumed that the angular frequency of the proper clock is $\omega_c$ and the angular frequency of over-sampling is $\omega_s$, a following expression has to be satisfied.

$$\omega_s \geq \frac{N}{N-2}\omega_c \tag{2}$$

The angular frequency $\omega_c$ of the proper clock shown in FIG. 3 can be obtained from a following expression.

$$|X(j\omega_k)| = \tag{3}$$

$$\frac{\{|X(j\omega_{k+1})| - |X(j\omega_k)|\}\omega_k - \{|X(j\omega_{k-1})| - |X(j\omega_{k-2})|\}\omega_{k-1} + \frac{2\pi}{NT}\{|X(j\omega_{k-1})| - |X(j\omega_k)|\}}{|X(j\omega_{k+1})| - |X(j\omega_k)| - |X(j\omega_{k-1})| - |X(j\omega_{k-2})|}$$

At this time, the initial phase $\theta(\omega_c)$ of the proper clock with respect to the over-sampling clock can be obtained from a following expression.

$$\theta(\omega_c) = \frac{\theta(\omega_k) - \theta(\omega_{k-1})}{\omega_k - \omega_{k-1}}\{\omega_c - \omega_{k-1}\} + \theta(\omega_{k-1}) \tag{4}$$

where $\theta(\omega_k)$, $\theta(\omega_{k-1})$ are phases of angular frequencies $\omega_k$, $\omega_{k-1}$ respectively.

The proper frequency (first frequency) and initial phase obtained according to the expressions (3), (4) in the clock extracting portion 113 of FIG. 1 are inputted to a phase error computing portion 114. The phase error computing portion 114 obtains a phase error with respect to the over-sampling clock of each clock pulse composing the proper clock (first clock) based on the inputted frequency and initial phase. That is, first, a mth clock sampling point of the proper clock (first clock) is converted to a phase at timing of the over-sampling clock. A phase $\theta_c(m)$ of a mth clock sampling point can be expressed as follows when the initial phase is $\theta_o$.

$$\theta_c(m) = \theta_0 + 2\pi m \cdot W_s / W_c \tag{5}$$

$$= \theta_0 + 2\pi m \cdot T_c / T_s$$

A phase of a nth clock sampling point of the over-sampling clock is expressed as follows.

$$\theta_s(n) = 2\pi n \tag{6}$$

Consequently, a phase error of the phase $\theta_c(m)$ of the mth clock sampling point of the proper clock relative to phases $\theta_s(n)$, $\theta_s(n+1)$ of nth and n+1th clock sampling points respectively of the over-sampling clock, which sandwich the mth clock sampling point of the proper clock on time axis, can be obtained here. Here is $$\theta_s(n) \leq \theta_c(m) \leq \theta_s(n+1) \tag{7}$$

If the expressions (5), (6) are substituted into the expression (7), a following expression can be obtained.

$$nT_s \leq \frac{\theta_0}{2\pi}T_s + mT_c \leq (n+1)T_s \tag{8}$$

Figure 4:
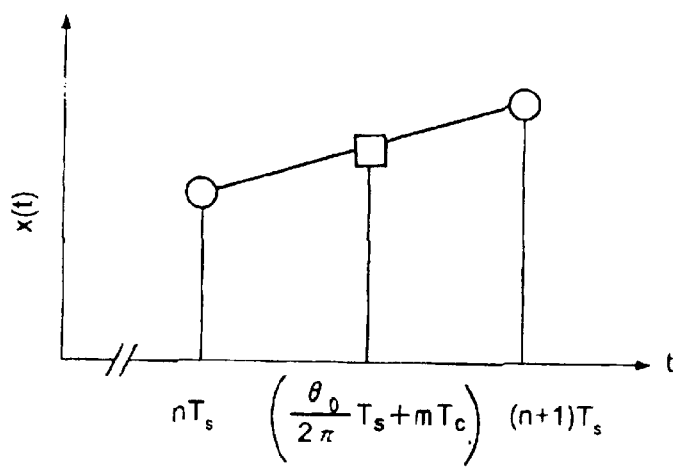
FIG. 4 is a diagram showing a relation between a mth clock sampling point of a proper clock and nth and n+1th clock sampling points of over-sampling clocks sandwiching the former clock on time axis.

FIG. 4 is a diagram showing a relation between the mth clock sampling point of the proper clock on time axis and nth and n+1th clock sampling points of the over-sampling clock, which sandwich the former.

The phase error obtained by the phase error computing portion 114 of FIG. 1 is inputted to the linear interpolating portion 115. In the linear interpolating portion 115, a signal value $$x\left(\frac{\theta_0}{2\pi}T_s + mT_c\right)$$

of the mth clock sampling point of the proper clock can be obtained from signal values $x(nT_s)$, $x((n+1)T_s)$ of the nth and n+1th over-sampling clock shown in FIG. 4 according to a following expression.

$$x\left(\frac{\theta_0}{2\pi}T_s + mT_c\right) = \{x((n+1)T_s - x(nT_s)\}\left\{\frac{\theta_0}{2\pi}T_s + mT_c - n\right\} + x(nT_s) \tag{9}$$

As described above, the digital signal value (second digital signal) obtained in this way is sent to the maximum likelihood detector 104 so as to detect maximum likelihood. A maximum detection result is RLL decoded by a RLL decoder 105 and then, error correction is carried out by an ECC 106 to reproduce correct data.

Figure 5:
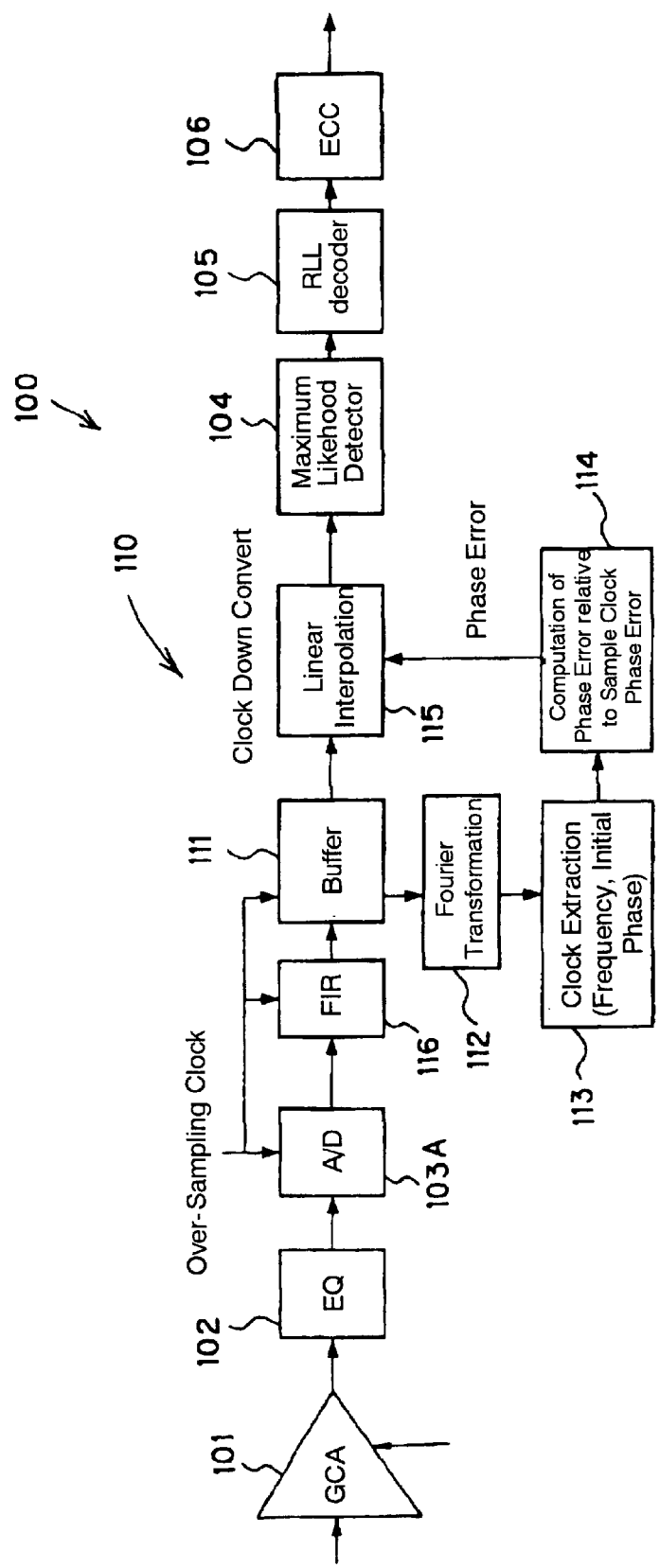
FIG. 5 is a block diagram showing a demodulator according to the second embodiment of the present invention.

FIG. 5 is a block diagram showing a demodulator according to a second embodiment of the present invention. A different point from the first embodiment will be described.

In the decoder 100B according to the second embodiment shown in FIG. 5, a FIR filter 116 for accelerating equalization by an equalizer 102 appropriate for digital signal A/D converted by the over-sampling clock is provided between the A/D converter 103A and buffer 111. The decoder 100B of the second embodiment intensifies equalization due to provision of the FIR filter 116 thereby making it possible to reproduce further accurate data.

Figure 6:
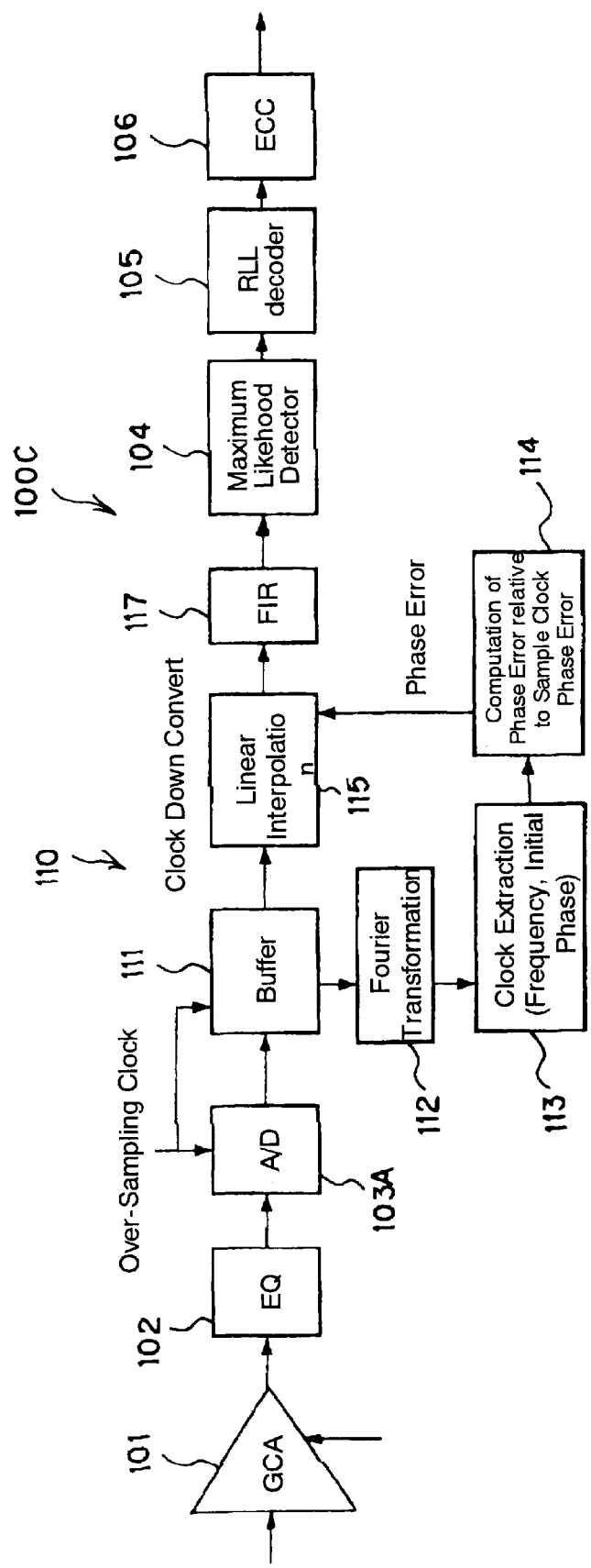
FIG. 6 is a block diagram showing a demodulator according to the third embodiment of the present invention.

FIG. 6 is a block diagram showing the third embodiment of a decoder according to the present invention. A different point from the first embodiment shown in FIG. 1 will be described.

In the decoder 100C of the third embodiment shown in FIG. 6, a FIR filter 117 which accelerates equalization by an equalizer 102 appropriate for the proper clock is disposed between a linear interpolating portion 115 composing the operating portion 110 and the maximum likelihood detector 104. The decoder 100C of the third embodiment can progress the equalization due to provision of the FIR filter 117 thereby making it possible to reproduce further accurate data like the second embodiment shown in FIG. 5.

Figure 7:
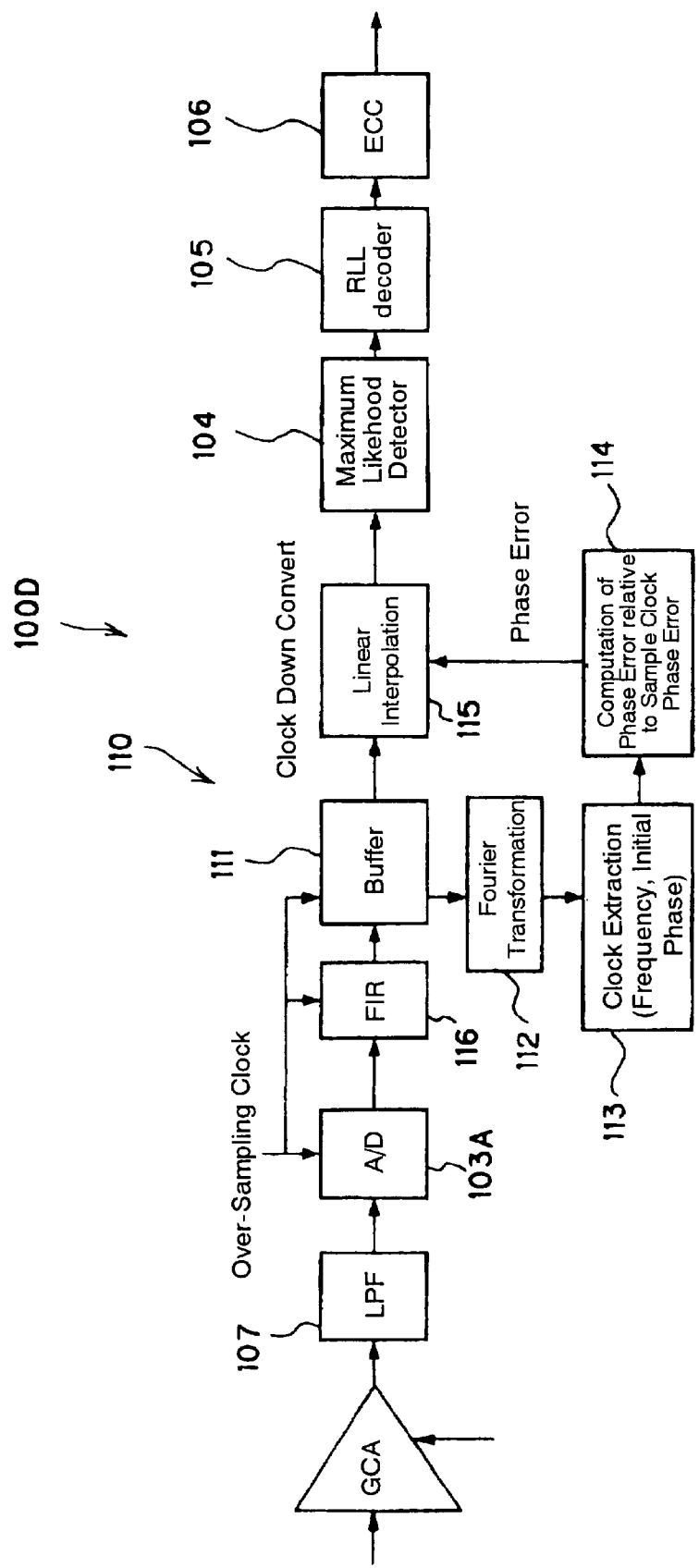
FIG. 7 is a block diagram showing a demodulator according to the fourth embodiment of the present invention.

FIG. 7 is a block diagram showing the fourth embodiment of a decoder according to the present invention. A different point from the first embodiment shown in FIG. 1 will be described.

In the decoder 100D of the fourth embodiment shown in FIG. 7, an analog low-pass filter 107 is provided instead of the equalizer 102 provided on the decoder 100A of the first embodiment shown in FIG. 1. Additionally, a FIR filter 116 is provided between the A/D converter 103A and the buffer 111 like the second embodiment shown in FIG. 5.

In the decoder 100D shown in FIG. 7, its analog circuit structure is simplified because of provision of the low-pass filter 107 instead of the equalizer 102 in the decoder 100A shown in FIG. 1. However, the equalization is not sufficient with the provision of the low-pass filter 107 alone. Thus, after conversion to digital signal by the A/D converter 103A, the equalization is accelerated by the FIR filter 116, so that sufficient equalization is achieved.

In all the embodiments including the fourth embodiment shown in FIG. 7, digital processing after the conversion to digital signal by the A/D converter 103A is carried out by firmware. Thus, analog processing is simplified even if the digital processing becomes complicated to some extent, thereby leading to reduction of the circuit size and production cost.

Figure 8:
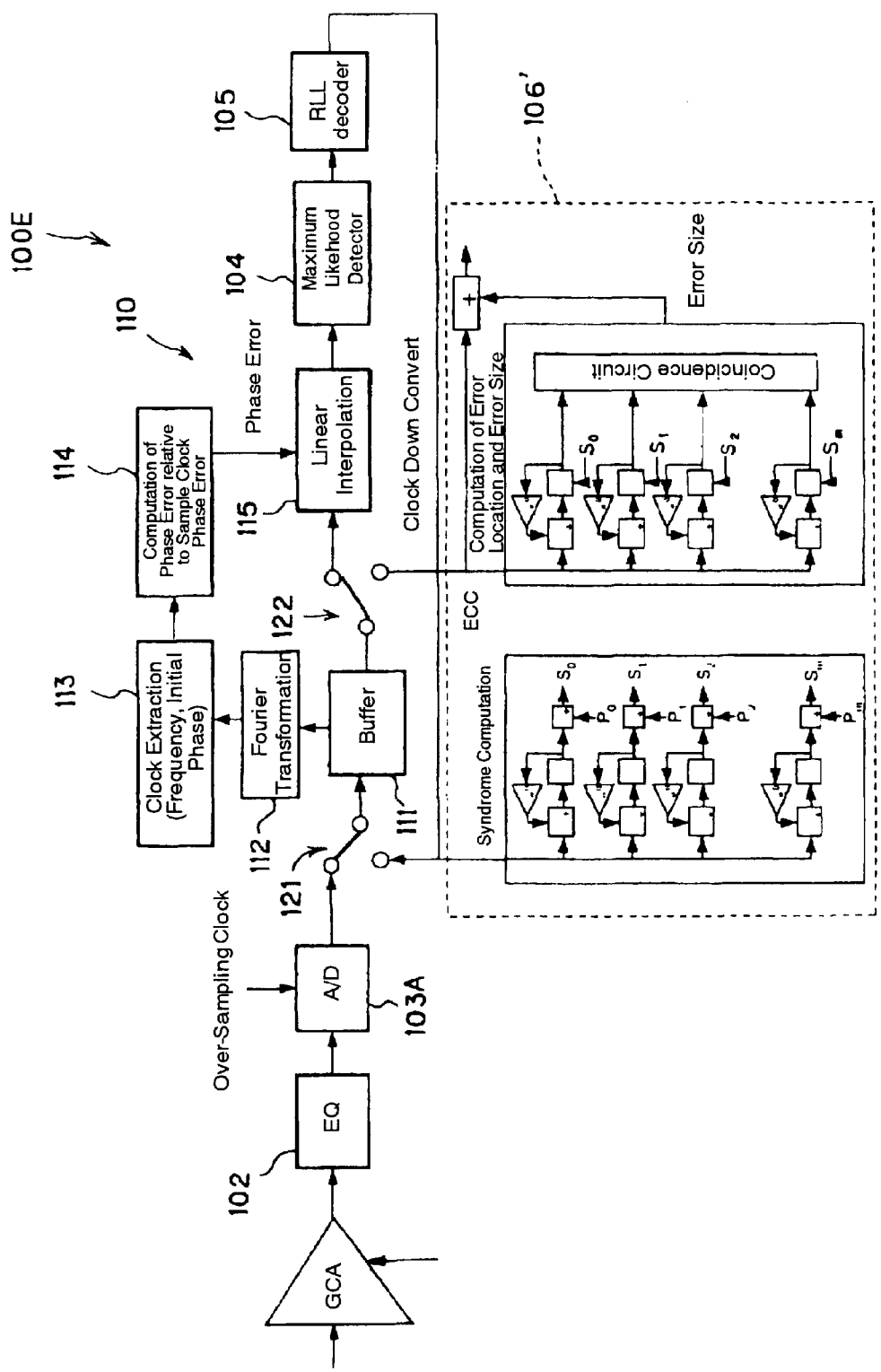
FIG. 8 is a block diagram showing a demodulator according to the fifth embodiment of the present invention.

FIG. 8 is a block diagram showing the fifth embodiment of a decoder according to the present invention.

The ECC 106 of the decoder 100A shown in FIG. 1 is represented with a block and it contains a buffer internally although not shown here.

The decoder 100E shown in FIG. 8 contains the buffer 111 for storing digital signal obtained by over-sampling by the A/D converter 103A which is also used as a buffer for the ECC.

To achieve this, the decoder 100E shown in FIG. 8 has switches 121, 122 before and after the buffer 111. When converting to digital signal by the A/D converter 103A and interpolating the digital signal by the operating portion 110, the buffer 111 is connected to the A/D converter 103A and the linear interpolating portion 122 by these switches 121, 122. After the interpolation ends, the switches 121, 122 are changed over, so that the buffer 111 functions as a buffer for the ECC 106'.

An output signal from the RLL decoder 105 is stored in the buffer 111 and at the same time, inputted to a first computing element for carrying out syndrome operation composing the ECC 106', so that initial values $S_0, S_1, \ldots S_m$ are generated. After that, these initial values $S_0, S_1, \ldots S_m$ are set in a second computing element for computing an error location and error size. At the same time, a signal form the buffer 111 is inputted to the second computing element and finally a corrected data is outputted. The ECC itself is a conventionally well-known technology and therefore, a detailed description thereof is omitted.

After computation for data of a sector in the ECC 106' is completed, the switches 121, 122 are changed over to a direction for connecting the buffer 111 to the A/D converter 103A and the linear interpolating portion 115 again. Then, an input of a signal of next sector is started.

In case of the decoder 100E shown in FIG. 8, the provision of the buffer 111 contributes to reduction of the circuit size.

In the above described respective embodiments, particularly the first embodiment, digital signal (first digital signal) obtained by the over-sampling is converted to a digital signal (second digital signal) corresponding to the proper clock by carrying out linear interpolation through computation shown by the expressions (1)–(9). However, the conversion from the first digital signal to the second digital signal does not always have to be based on the computation on the expressions (1)–(9) and the interpolation does not have to be linear interpolation. That is, it is just necessary to reproduce the second digital signal synchronous with the proper clock from the first digital signal obtained by the over-sampling.

In the above described respective embodiments, all the data structure shown in FIG. 2 is over-sampled regardless of which sync byte portion SB or actual data. However, it is permissible to over-sample only several bytes of the data portion and store in the buffer, Fourier-transform that over-sampled portion to extract the proper clock frequency and initial phase, and then sample the data portion and a remaining portion following the beginning several bytes in the data portion according to the proper clock.

In the above description, it is assumed that the embodiment of the present invention is incorporated in the magnetic disc unit. However, the present invention is not restricted to application to the magnetic disc unit. The present invention can be widely applied to a case in which analog signal obtained by reading out information stored in a recording medium is converted to digital signal and demodulated so as to generate data representing the information recorded in the recording medium.

What is claimed is:

1. A demodulation method for demodulation by converting analog signal carrying a first clock of a predetermined first frequency obtained by reading information recorded in a recording medium to digital signal so as to generate data representing said information, wherein the analog signal is converted to a first digital signal by over-sampling synchronous with a second clock of a second frequency higher than the frequency of the first clock, the first digital signal is stored in a buffer, and a phase error of the first clock with respect to the second clock is obtained based on the first digital signal stored in the buffer.

2. A demodulator for demodulation by converting analog signal carrying a first clock of a predetermined first frequency obtained by reading information recorded in a recording medium to digital signal so as to generate data representing said information, said demodulator comprising:

an A/D converter for converting the analog signal to a first digital signal by over-sampling synchronous with a second clock of a second frequency higher than the frequency of the first clock;

a buffer for storing the first digital signal; and an operating portion for obtaining a phase error of the first clock with respect to the second clock based on the first digital signal stored in the buffer.

3. A demodulator according to claim 2 wherein the operating portion comprises:

a Fourier transforming portion for Fourier-transforming the first digital signal;

a clock extracting portion for obtaining the first frequency and an initial phase of the first clock with respect to the second clock from Fourier transformation signal obtained from the Fourier transformation by the Fourier transforming portion; and a phase error computing portion for obtaining a phase error of each clock pulse of the first clock with respect to the second clock based on the first frequency and the initial phase obtained by the clock extracting portion.

4. A demodulator according to claim 3 wherein the clock extracting portion obtains the first frequency by linear estimation of amplitude values of frequencies above and below the first frequency based on amplitude information of the amplitude information and phase information composing the Fourier transformation signal, and obtains the initial phase by linear interpolation using the phases of frequencies above and below the first frequency based on the phase information.

5. A demodulator according to claim 3 wherein the operating portion further comprises an interpolation computing portion for obtaining a second digital signal synchronous with the first clock by interpolating the first digital signal based on phase error information obtained by the phase error computing portion.

6. A demodulator according to claim 2 further comprising an equalizer for equalizing analog signal obtained by reading information stored in a recording medium, provided at a pre-stage of the A/D converter.

7. A demodulator according to claim 2 further comprising a low-pass filter portion for carrying out low-pass filtering on analog signal obtained by reading information stored in the recording medium, provided at a pre-stage of the A/D converter.

8. A demodulator according to claim 2 further comprising a FIR filter conforming to the second clock to progress the equalization, provided between the A/D converter and the buffer.

9. A demodulator according to claim 2 further comprising a demodulating portion for generating data indicating the information by demodulation provided at a post-stage of the operating portion and a FIR filter conforming to the first clock so as to progress the equalization between the operating portion and the demodulating portion.

10. A demodulator according to claim 2 further comprising a demodulating portion for generating data indicating the information by demodulation, the demodulating portion including an error correction code portion acting as a buffer at the same time.

* * * * *

UNITED STATES PATENT AND TRADEMARK OFFICE
CERTIFICATE OF CORRECTION

PATENT NO. : 6,674,592 B2
DATED : January 6, 2004
INVENTOR(S) : Kaneyasu Shimoda It is certified that error appears in the above-identified patent and that said Letters Patent is hereby corrected as shown below:

<u>Title page,</u>
Item [57], ABSTRACT,
Line 9, delete "computation maximum" and insert -- computation. Maximum --.

Signed and Sealed this

Twenty-ninth Day of June, 2004

JON W. DUDAS
*Acting Director of the United States Patent and Trademark Office*